(12) United States Patent
Gavazzi et al.

(10) Patent No.: US 11,268,583 B2
(45) Date of Patent: Mar. 8, 2022

(54) FRICTION ASSEMBLY, BRAKE CALIPER AND MANUFACTURING METHOD

(71) Applicant: FRENI BREMBO S.P.A., Bergamo (IT)

(72) Inventors: Andrea Gavazzi, Curno (IT); Paolo Varotto, Curno (IT); Luca Maestrini, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 120 days.

(21) Appl. No.: 16/076,075

(22) PCT Filed: Jan. 26, 2017

(86) PCT No.: PCT/IB2017/050403
§ 371 (c)(1),
(2) Date: Aug. 7, 2018

(87) PCT Pub. No.: WO2017/137863
PCT Pub. Date: Aug. 17, 2017

(65) Prior Publication Data
US 2019/0186570 A1  Jun. 20, 2019

(30) Foreign Application Priority Data
Feb. 8, 2016  (IT) .................. 102016000012650

(51) Int. Cl.
*F16D 65/092* (2006.01)
*F16D 65/00* (2006.01)
(Continued)

(52) U.S. Cl.
CPC ....... *F16D 65/092* (2013.01); *F16D 65/0068* (2013.01); *F16D 69/04* (2013.01);
(Continued)

(58) Field of Classification Search
CPC ................ F16D 69/04; F16D 69/0408; F16D 2069/0441; F16D 2069/0483;
(Continued)

(56) References Cited

U.S. PATENT DOCUMENTS 4,173,681 A * 11/1979 Durrieu .................. B29B 11/06
428/409
5,376,410 A   12/1994 MacKelvie
(Continued)

FOREIGN PATENT DOCUMENTS

DE    29821482 U1   4/2000
EP     1006289 A2   6/2000
(Continued)

OTHER PUBLICATIONS

European Patent Office, International Search Report with Written Opinion issued in PCT/IB2017/050403, dated May 19, 2017, 10 pages, European Patent Office, Rijswijk, Netherlands.
(Continued)

*Primary Examiner* — Bradley T King
(74) *Attorney, Agent, or Firm* — Marshall & Melhorn, LLC

(57) ABSTRACT

A friction assembly has a support plate, at least one brake pad and at least one reinforcing foil of the plate. The brake pad and the support plate are co-moulded from at least one heat-resistant resin. The reinforcing foil is fixed to the support plate via anchoring projections, joined to and which extend away from the foil, embedded in the resin to prevent or limit deformations of the support plate in the use of the assembly.

14 Claims, 2 Drawing Sheets

(51) Int. Cl.
*F16D 69/04* (2006.01)
*F16D 69/00* (2006.01)

(52) U.S. Cl.
CPC ............... *F16D 2069/001* (2013.01); *F16D 2069/0441* (2013.01); *F16D 2069/0483* (2013.01); *F16D 2200/0039* (2013.01); *F16D 2200/0043* (2013.01); *F16D 2200/0086* (2013.01)

(58) Field of Classification Search
CPC ....... F16D 2200/006; F16D 2200/0065; F16D 2200/0086
See application file for complete search history.

(56) References Cited

U.S. PATENT DOCUMENTS

| 6,022,502 | A* | 2/2000 | Lockhart | B29C 37/0078 264/113 |
| 6,267,206 | B1* | 7/2001 | Grimme | F16D 65/0006 188/73.1 |
| 8,960,384 | B2 | 2/2015 | Turani et al. | |
| 9,022,184 | B2 | 5/2015 | Passalacqua et al. | |
| 9,360,067 | B1* | 6/2016 | Arbesman | F16D 65/092 |
| 2001/0003321 | A1* | 6/2001 | Sano | F16D 65/092 188/218 XL |
| 2003/0155193 | A1* | 8/2003 | Hays, Jr. | F16D 65/092 188/250 R |
| 2005/0161297 | A1* | 7/2005 | Uwaydah | F16D 69/04 188/250 B |
| 2010/0065389 | A1* | 3/2010 | Gilboy | F16D 65/092 188/251 R |
| 2011/0198170 | A1 | 8/2011 | Turani et al. | |
| 2015/0053517 | A1* | 2/2015 | Arbesman | F16D 69/0408 188/251 A |
| 2016/0091042 | A1* | 3/2016 | Arbesman | F16D 69/04 188/251 R |
| 2016/0363183 | A1* | 12/2016 | Arbesman | F16D 55/225 |
| 2017/0138424 | A1 | 5/2017 | Maestrini et al. | |
| 2017/0152904 | A1* | 6/2017 | Lee | F16D 69/0408 |
| 2017/0219033 | A1* | 8/2017 | Arbesman | F16D 69/04 |
| 2019/0077110 | A1* | 3/2019 | Arbesman | F16D 69/027 |

FOREIGN PATENT DOCUMENTS

| EP | 2204591 | A1 | 7/2010 |
| EP | 2478252 | B1 | 10/2014 |
| GB | 2311569 | A | 10/1997 |
| JP | 2011530680 | A | 12/2011 |
| JP | 2015537176 | A | 12/2015 |
| WO | 2011033395 | A1 | 3/2011 |
| WO | 2014087236 | A1 | 6/2014 |
| WO | 2014141995 | A1 | 9/2014 |
| WO | 2015010183 | A1 | 1/2015 |
| WO | 2105173768 | A1 | 11/2015 |

OTHER PUBLICATIONS

Japanese Patent Office, Japanese Office Action (Notice of Reasons for Refusal) issued in application No. JP2018-538610 dated Sep. 29, 2020, 16 pages.

* cited by examiner

FRICTION ASSEMBLY, BRAKE CALIPER AND MANUFACTURING METHOD

FIELD OF THE INVENTION

The present invention relates to a friction assembly, a method for the manufacture of a friction assembly, and a brake caliper mounting such assembly.

BACKGROUND OF THE INVENTION

Document WO 2015/173768 A1 on behalf of the same applicant discloses a support plate and brake-pad for co-moulding in a resin, so as to make the assembly of such components lighter than the systems using a metal plate for the same performance.

Although such known solution is an improvement from a plurality of points of view, the field of application of the system discussed in document WO/2015 173768 A1 is still very limited.

The present invention falls within the above context, proposing to provide a friction assembly of at least comparable reliability to the prior systems, but modified to be usable in a much broader range of production lines.

SUMMARY OF THE INVENTION

Such objective is achieved by a friction assembly comprising a support plate, at least one brake pad and at least one reinforcing foil of said plate, wherein the brake pad and the support plate are co-moulded from at least one heat-resistant resin, and wherein the reinforcing foil is fixed to the support plate by means of anchoring projections, joined to and that develop away from said foil, embedded in said resin to prevent or limit deformations of the support plate in the use of said assembly. Such objective is achieved also by a method of making a friction assembly comprising the steps of: co-moulding a support plate and at least one brake pad from at least one heat-resistant resin; fixing a reinforcing foil to the support plate by embedding in said resin anchoring projections, joined to and that develop away from said foil, to prevent or limit deformations of the support plate in the use of said assembly. Such objective is achieved also by a brake-caliper comprising a friction assembly as mentioned before, or an assembly made according to the mentioned method. The dependent claims show preferred embodiment variants.

BRIEF DESCRIPTION OF THE DRAWINGS

The object of the present invention will now be described in detail, with the help of the appended drawings, wherein.

DETAILED DESCRIPTION

Figure 1:
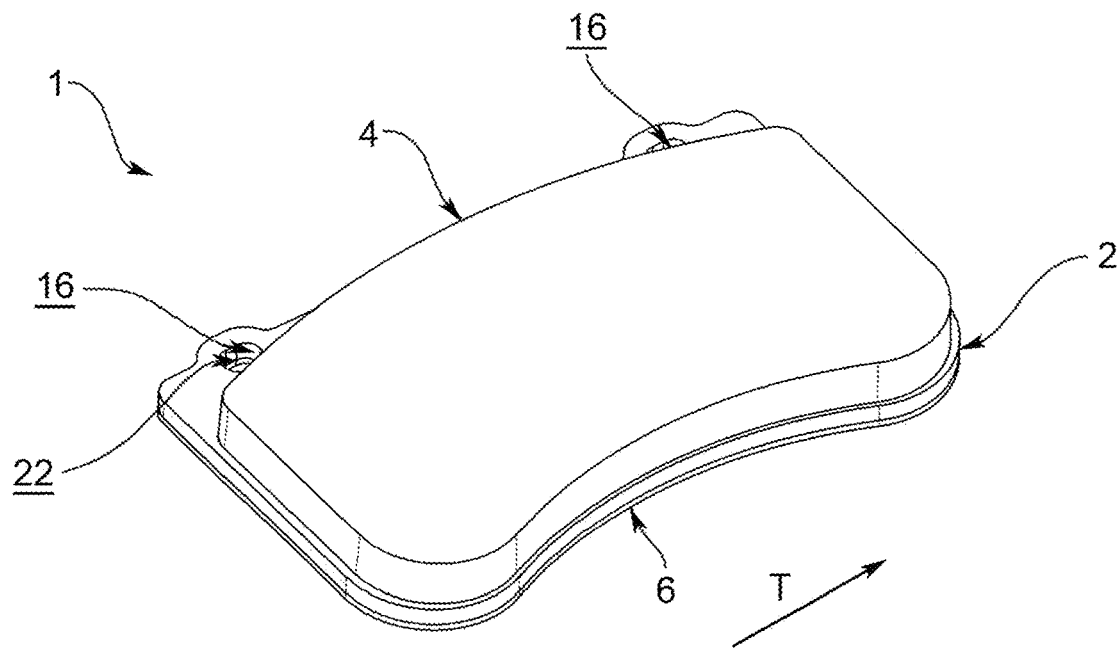
FIGS. 1 and 2 respectively show a perspective and a side view in cross-section of an assembly of the present invention, according to one possible embodiment.

With reference to the aforementioned drawings, reference numeral 1 globally denotes a friction assembly comprising a support plate 2, at least one brake pad 4 and at least one reinforcing foil 6 of said plate 2.

According to one embodiment, the reinforcing foil 6 has a maximum thickness of about 2 mm.

According to one embodiment, the reinforcing foil 6 has a minimum thickness of about 0.5 mm.

According to a first variant, the reinforcing foil 6 is made of metal, such as steel or aluminium.

According to a second variant, the reinforcing foil 6 is made of a composite material, such as a carbon-based material.

According to a fourth variant, the support plate 2 identifies one or more holes 16 through its thickness suitable to be engaged in a movable manner by guides (not shown) of a brake-caliper, especially upon approaching (and moving away from) a corresponding disc to be braked.

Optionally, the reinforcing foil 6 may define lumina 22 at least partially aligned with the holes 16 of the support plate 2.

According to the embodiment shown, the reinforcing foil 6 and support plate 2 extend in a contact plane C between them such that the reinforcing foil 6 remains confined in the profile of the support plate 2, in particular without projecting externally to said plate.

In other words, within the aforesaid plane C, the reinforcing foil 6 has an extension equal to or smaller than the extension of the support plate 2 in the same plane.

Optionally, the aforesaid assembly could comprise at least one protective layer, such as an anti-corrosive layer at least partially covering the reinforcing foil 6.

In such assembly 1, the brake pad 4 and the support plate 2 are (preferably hot co-moulded) in at least one heat-resistant resin.

Preferably, the heat-resistant resin is a thermosetting resin.

Advantageously, the heat-resistant resin is a phenolic resin, such as a novolac.

Preferably, the heat-resistant resin (or phenol resin) is the same for the support plate 2 and for the brake pads 4.

According to one embodiment, the support plate 2 and the brake pad 4 are made from different heat-resistant resins, for example belonging to the same family of polymeric materials.

According to a variant, the phenolic resin comprises or consists of the resin CAS no. 9003-35-4.

According to a further variant, the resin is heat resistant at least up to the maximum operating temperature of the assembly 1.

The heat resistant resin of the support plate 2 may optionally be loaded with reinforcing fibres, preferably non-metallic. Purely by way of example, the reinforcing fibres used could comprise carbon fibres, glass fibres, boron fibres, silica fibres, silicon carbide fibres, ceramic fibres and mixtures thereof.

Glass fibres are a particularly preferred embodiment of this invention.

For example, the ratio between the weight of heat-resistant resin and the weight of the optional reinforcing fibres could be between 0.1 and 3.0, advantageously between 0.3 and 2.0, optionally between 0.4 and 1.8, for example between 0.7 and 1.5.

Preferably, the reinforcing fibres are of a mean length equal to or greater than about 12 mm (for example equal to or greater than 13 or 14 mm) to increase the mechanical strength of the support plate 2, at least compared to a heat-resistant resin plate devoid of the aforesaid fibres.

According to one embodiment, the reinforcing fibres are of an average length equal to or greater than about 12 millimetres, for example comprised in the range of 4-11 millimetres.

According to one advantageous embodiment, the reinforcing fibres are oriented mainly or exclusively in a transversal stress direction T of the brake pad 4 (referred to a configuration of correct use of the assembly 1 in a brake caliper for a disc brake).

According to a further variant, the brake pad 4 is instead devoid of reinforcing fibres.

A preferred embodiment provides, however, that the heat resistant resin of the brake pad 4 comprises at least one friction modifier component.

Purely by way of example, the friction modifier component could be selected from a powdered metal (such as copper, iron, aluminium, and/or zinc), an aluminium or silicon oxide, a flaking material (such as graphite or mica), or combinations thereof.

Figure 2:
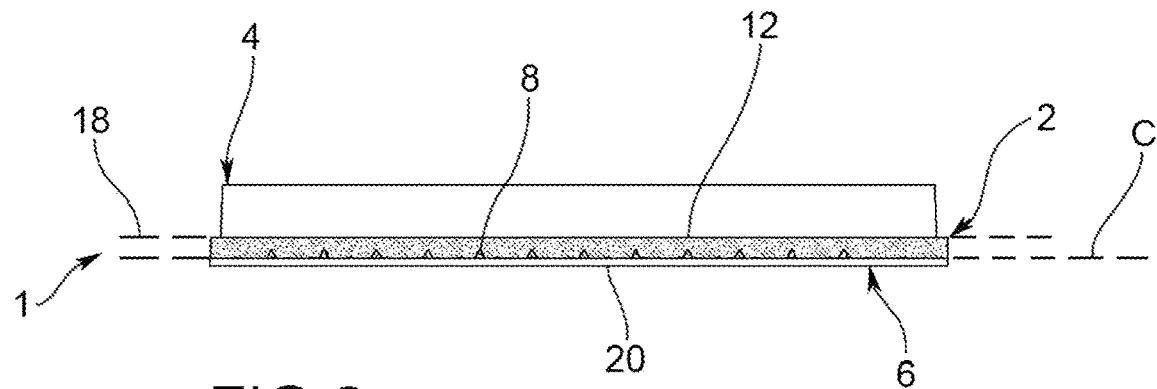

With reference to the variant in FIG. 2, the separation zone between the support plate 2 and the brake pad 4 has been schematically shown as a net division plane 18 of said components. This represents however a graphical representation because, in actual fact, the separation zone could most probably be an uneven plane or even a volume inside which there is an intimate mixing of heat-resistant resin with optional reinforcing fibres (for the support plate), and heat-resistant resin preferably free of such fibres and optionally loaded with a friction modifier-component—belonging to the brake pads.

The reinforcing foil 6 is fixed to the support plate by means of anchoring projections 8, joined to and extending away from the foil 6, and are embedded in the aforesaid resin to prevent or limit deformations of the support plate in the use of the assembly 1.

According to different embodiments, the anchoring projections 8 could be in the form of a pointed element, a pin, cylinder or hook. According to another embodiment, one or more anchoring projections may be in the form of a cordon or rib.

Figure 4:
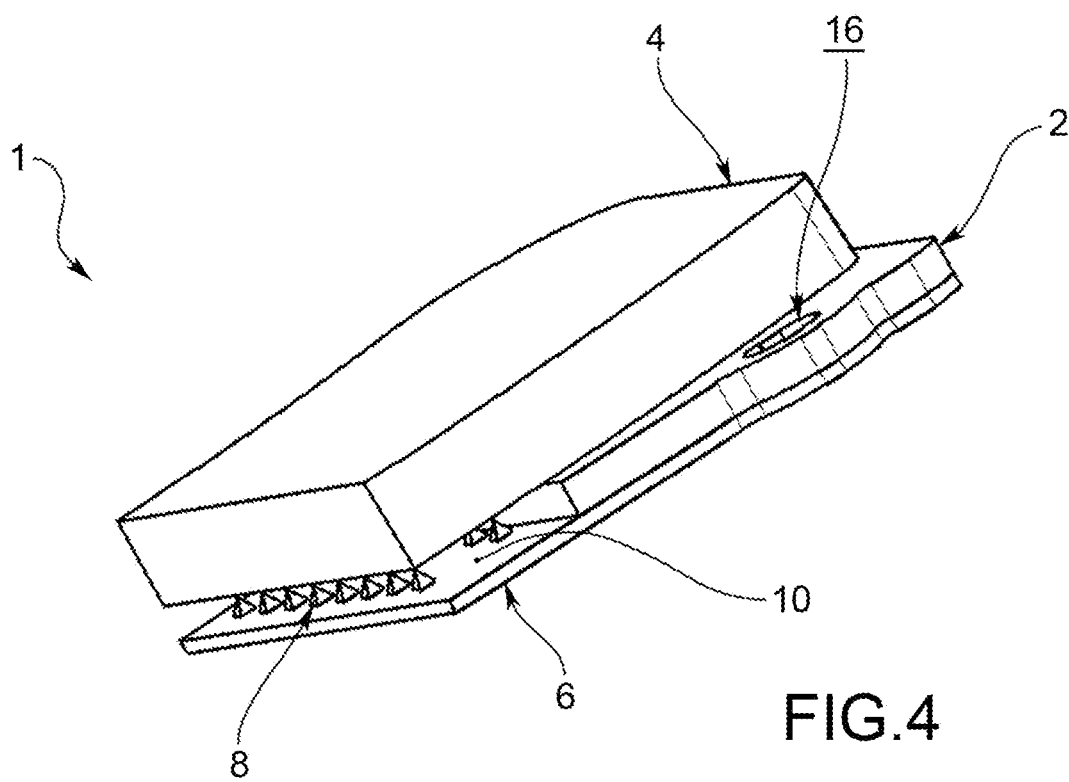
FIGS. 4 and 5 are perspective views of the assembly in FIG. 1 wherein part of the support plate has been omitted to show the otherwise hidden anchoring projections, insofar as incorporated in the support plate.
Figure 5:
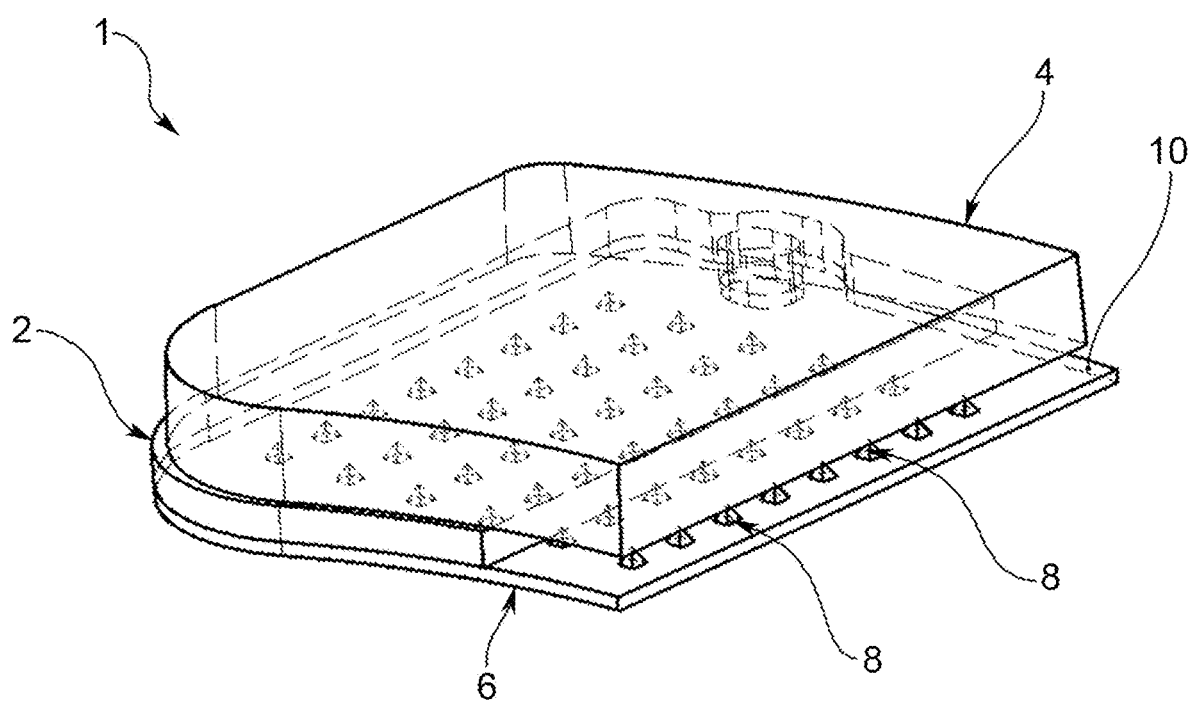

For example, as shown schematically in FIG. 4 or 5, the anchoring projections 8 may be shaped as a pyramid, cylinder, truncated cone, cone or truncated pyramid.

According to a preferred variant, the anchoring projections 8 are made in one piece with the reinforcing foil 6.

According to a further variant, the anchoring projections 8 project only from one surface 10 of the reinforcing foil 6, facing the support plate 2, the opposite surface 20 of such foil being instead without projections.

According to yet a further variant, the reinforcing foil 6 has no perforations (specifically: through its thickness) in the area superposing the brake pad 4.

According to a particularly advantageous embodiment, the anchoring projections 8 are distributed on the surface 10 of the reinforcing foil 6 with a density at least equal to, or greater than, about 1-40 projections/cm$^2$ (for example 1-20 projections/cm$^2$), to achieve a monolithic union between the reinforcing foil 6 and the support plate 2.

According to a not shown embodiment, in correspondence of the base of at least part of the anchoring projections, the reinforcing foil could delimit depressions of a substantially complementary shape to said projections.

In fact, a possible variant of the manufacturing method discussed below could provide that the anchoring projections can be generated from the thickness of the reinforcing foil—excavating it in part—thus generating the depressions and projections.

Figure 3:
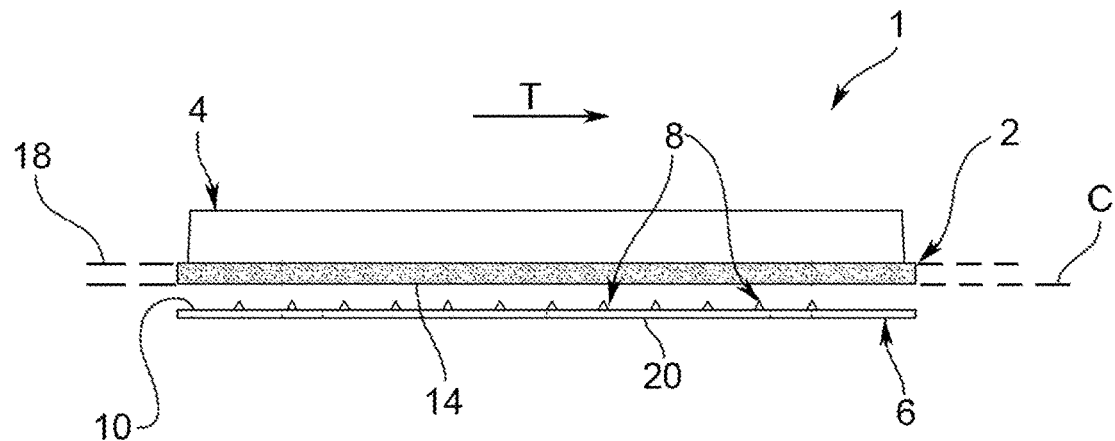
FIG. 3 illustrates a view corresponding to that of FIG. 2, but with partially separated parts.

With reference for example to the variant in FIG. 3, the brake pad 4 is co-moulded to an opposite surface 12 of the support plate 2 with respect to the surface 14 to which the reinforcing foil 6 is anchored, to create a sandwich structure.

The present invention also relates to a method of manufacturing a friction assembly.

Since a preferred embodiment of the method provides for it to be used to produce a friction assembly 1 according to any one of the preceding embodiments, preferred or advantageous variants of such method may comprise any step—even implicitly inferable—from the preceding description of the assembly.

The method comprises the steps of:
- co-moulding a support plate 2 and at least one brake pad 4 from at least one heat-resistant resin;
- fixing a reinforcing foil 6 to the support plate 2 by embedding in the heat-resistant resin anchoring projections 8, joined to and which extend away from the foil 6, to prevent or limit deformations of the support plate in the use of said assembly 1.

According to a particularly advantageous embodiment, the co-moulding step and the fixing step take place at least partially simultaneously, for example during one or more steps of compression moulding.

Optionally, the fixing step may occur after the co-moulding step. More precisely, downstream of the co-moulding, the reinforcing foil 6 may be forced into the support plate 2, so that the anchoring projections 8 are wedged inside the resin of the plate, remaining therein embedded.

The present invention lastly relates to a brake caliper comprising a friction assembly 1 according to any one of the embodiments illustrated previously, or to an assembly manufactured according to the discussed method.

The purpose of the present invention will now be illustrated on the basis of a non-limiting example.

Example: Co-Moulding of the Friction Assembly

To co-mould the aforesaid assembly a hot press is used with a mould modified so as to delimit two juxtaposed or superposed cavities: a first moulding cavity is intended to receive the heat-resistant resin of the support plate, a second moulding cavity housing instead the heat-resistant resin of the brake pad.

The reinforcement foil is then placed in the first cavity, after which the heat resistant resin optionally loaded with reinforcing fibres is evenly distributed to fill such cavity. A similar or a different heat-resistant resin is placed in the second moulding cavity optionally in the presence of at least one friction modifier component.

The moulding temperatures may vary between 130° C. and 190° C. depending on the resins used, while the operating pressures will be in the range 10-50 MPa. Depending on the size of the pad and the quantity of resins used, the moulding times may vary from one to about ten minutes, often 2-5 minutes.

When the moulding of the friction assembly is complete, it is placed in an oven at a temperature of about 220° C. to complete the cross-linking of the resin/s.

Innovatively, the assembly, the caliper and the method described allow the predetermined objectives to be achieved.

In particular, the presence of the reinforcing foil allows an improvement of the thermomechanical resistance and the dimensional stability of the assembly, reducing the overall weight compared to conventional systems.

Advantageously, the use of a metal reinforcing foil does not involve a drastic increase in weight of the assembly, since the foil utilised has a reduced thickness compared to the overall thickness of the prior metal plates.

Advantageously, the assembly and the caliper of the present invention allow a substantial reduction in weight to be achieved compared to the traditionally used systems, of course for at least equivalent overall performance.

Advantageously, the use of a single reinforcing foil allows a saving in weight of the assembly, a reduction of the production cost, and optimized warehouse management to be achieved.

Advantageously, by virtue of the expedients described, the scope of application of the plate described is broadened.

Advantageously, the method of the present invention allows all the essential components—that is to say the support plate, the brake-pad and the reinforcing foil—to be moulded in a single operation.

Advantageously, the assembly and the caliper of the present invention are highly reliable, in that the materials of the plate and the brake pad are bonded together in an inseparable manner.

Advantageously, the assembly and the caliper of the present invention allow the adhesive layer between the plate and the brake pad to be dispensed with, resulting in a favourable impact on production costs and on the reliability of the assembly.

Advantageously, the assembly of the present invention allows a reduction of the deformations of the plate of about 30% to be achieved compared to the solutions without the reinforcing foil.

Advantageously, the assembly and the caliper of the present invention are constructively simple and therefore producible at low cost and with repetitive and automated operations.

Advantageously, the assembly of the present invention has a low heat conductivity, so that the probability of occurrence of vapour lock phenomena of the caliper-brake is reduced.

Advantageously, although the long fibres are much more difficult to form in the heat-resistant resin, they provide unexpected mechanical performance.

A person skilled in the art may make variations to the embodiments of the assembly, of the caliper brake and of the method described above so as to satisfy specific requirements, replacing elements with others functionally equivalent.

Such variants are also contained within the scope of protection as defined by the following claims.

In addition, each variant described as belonging to a possible embodiment may be realised independently of the other embodiments described.

The invention claimed is:

1. A friction assembly, comprising:
a support plate comprising at least a support plate organic matrix,
at least one brake pad comprising at least a brake pad organic matrix, and
at least one reinforcing foil of said plate;
wherein the brake pad and the support plate are simultaneously co-moulded from both said support plate organic matrix and said brake pad organic matrix, and
wherein where said support plate overlaps said at least one brake pad said support plate has no through holes,
wherein the reinforcing foil is fixed to the support plate via anchoring projections, joined to and that develop away from said foil, embedded in said resin to prevent or limit deformations of the support plate in the use of said assembly;
wherein where said reinforcing foil overlaps said at least one brake pad, said reinforcing plate has no through holes,
wherein the brake pad is co-moulded to an opposite surface of the support plate with respect to the surface to which the reinforcing foil is anchored to create a sandwich structure.

2. The assembly according to claim 1, wherein the anchoring projections are distributed on a surface of the reinforcing foil with a density at least equal to, or greater than, about 1-40 projections/cm$^2$, to achieve a monolithic union between the reinforcing foil and the support plate.

3. The assembly according to claim 1, wherein the anchoring projections are made in one piece with the reinforcing foil.

4. The assembly according to claim 1, wherein the anchoring projections only protrude from a surface of the reinforcing foil, facing the support plate.

5. The assembly according to claim 1, wherein the reinforcing foil has a maximum thickness of about 2 millimetres, and a minimum thickness of about 0.5 millimetres.

6. The assembly according to claim 1, wherein the support plate comprises, through its thickness, one or more holes suitable to be engaged in a translatable manner by the guides of a brake caliper, and wherein the reinforcing foil delimits openings at least partially aligned with said holes.

7. The assembly according to claim 1, wherein the reinforcing foil is made of a metallic material or of a composite material and wherein said assembly comprises at least one protective layer at least partially covering the reinforcing foil.

8. The assembly according to claim 1, said at least one a heat-resistant resin comprises phenolic resin.

9. The assembly according to claim 1, wherein the heat-resistant resin of the support plate is partially loaded with non-metallic reinforcement fibres, said fibres being selected from the group consisting of carbon fibres, glass fibres, boron fibres, silica fibres, silicon carbide fibres, ceramic fibres and mixtures thereof.

10. The assembly according to claim 9, wherein the reinforcement fibres are of an average length equal to or greater than about 12 millimetres, or comprised in the range of 4 to 11 millimetres.

11. The assembly according claim 9, wherein the reinforcement fibres are oriented prevalently or exclusively along a transversal stress direction of said brake pad, in a configuration of correct use of said assembly in a disc brake caliper.

12. A method of making a friction assembly, comprising the steps of:
simultaneously co-moulding a support plate and at least one brake pad from at least one heat-resistant resin, the at least one heat-resistant resin being received in a mould delimiting two juxtaposed or superposed cavities, wherein where said support plate overlaps said at least one brake pad, said support plate has no through holes;
fixing a reinforcing foil to the support plate by embedding in said resin anchoring projections, joined to and that develop away from said foil, to prevent or limit deformations of the support plate in the use of said assembly, wherein where said reinforcing foil overlaps said support plate, said reinforcing foil has not through holes;

wherein the brake pad is co-moulded to an opposite surface of the support plate with respect to the surface to which the reinforcing foil is anchored, to create a sandwich structure;

wherein said support plate comprises at least a support plate organic matrix and said at least one brake pad comprises at least a brake pad organic matrix.

13. The method according to claim 12, wherein the co-moulding step and the fixing step takes place partially simultaneously, during one or more steps of compression moulding.

14. A friction assembly, comprising:

a support plate comprising at least a support plate organic matrix, at least one brake pad comprising at least a brake pad organic matrix, and at least one reinforcing foil of said plate;

wherein the brake pad and the support plate are simultaneously co-moulded from at least one heat-resistant resin to realize both said support plate organic matrix and said at least a brake pad organic matrix, wherein where said at least one brake pad and said support plate overlap, there are no through holes in said support plate, and wherein the reinforcing foil is fixed to the support plate via anchoring projections, joined to and that develop away from said foil, embedded in said resin to prevent or limit deformations of the support plate in the use of said assembly, wherein where said reinforcing foil overlaps with said support plate there are no through holes in said reinforcing foil;

wherein the brake pad is co-moulded to an opposite surface of the support plate with respect to the surface to which the reinforcing foil is anchored, to create a sandwich structure.

\* \* \* \* \*